3,489,681
SEPARATION OF SOLIDS FROM LIQUIDS
Howard G. Flock, Bethel Park, and Herbert J. Zeh, Jr., Pittsburgh, Pa., assignors to Calgon Corporation, Pittsburgh, Pa.
No Drawing. Filed Aug. 16, 1968, Ser. No. 753,053
Int. Cl. C02b 1/20
U.S. Cl. 210—54          9 Claims

ABSTRACT OF THE DISCLOSURE

Water-soluble copolymers of diocetone acrylamide and various comonomers are used to clarify water having solids suspended therein.

BACKGROUND OF THE INVENTION

In U.S. Patent 3,277,056 a new monomer, copolymerizable with other monomers of the types described therein, is disclosed. It is an N-3-oxohydrocarbon-substituted acrylamide having the formula

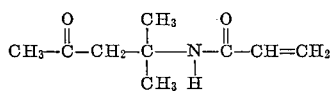

All of the polymers used in our invention are polymers of diacetone acrylamide. They are, however, also water-soluble. It will be observed from the disclosure of U.S. Patent 3,277,056 that homopolymers of diacetone acrylamide are water-soluble.

SUMMARY OF THE INVENTION

This invention relates to methods of flocculating, accelerating the rate of flocculation, and/or accelerating the settling of solids which are suspended in aqueous media, by adding thereto small amount of water-soluble copolymer of (a) at least about 2.5% diacetone acrylamide and (b) monomer copolymerizable therewith. Among the monomers copolymerizable with diactone acrylamide are those listed in columns four and five of U.S. Patent 3,277,056. Our invention utilizes only copolymers which are water-soluble.

Table I shows the results of flocculating and settling samples of water from the Illinois River. Coagulant aid bentonitic clay was used in conjunction with the polymer treatment. In the arbitrary scale of results, the lower numbers represent superior performance.

In Table I and throughout this description, the letter designations for various polymers are as follows:

Polymer:
- A ____ A high molecular weight (at least 1 million) polyacrylamide in which about 3–4% of the amide groups are hydrolyzed to the acid form.
- B ____ An unhydrolyzed copolymer of, by weight, 80% acrylamide and 20% dimethyl diallyl ammonium chloride.
- C ____ An unhydrolyzed copolymer of, by weight, 75% acrylamide and 25% diacetone acrylamide.
- D ____ Same as polymer C, about 10% hydrolyzed.
- E ____ A high molecular weight starch.
- F ____ An unhydrolyzed copolymer of, by weight, 50% acrylamide and 50% diacetone acrylamide.

TABLE I

| Alum, p.p.m. | Clay, p.p.m. | Polymer | P.p.m. | NaOH, P.p.m. | Forming Speed | Size | Settling Rate | Clarity |
|---|---|---|---|---|---|---|---|---|
| 25 | 10 | A | 0.5 | 10 | 1 | 11 | 12 | 7 |
| 25 | 10 | B | 0.5 | 10 | 1 | 9− | 7 | 7 |
| 25 | 10 | C | 0.5 | 10 | 1 | 11+ | 13 | 6+ |
| 25 | 10 | D | 0.5 | 10 | 1 | 11+ | 13 | 6+ |
| 25 | 10 | E | 2 | 10 | 1 | 9 | 7+ | 6+ |
| 10 | 20 | A | 0.2 |  | 1 | 12 | 11 | 8 |
| 10 | 20 | C | 0.2 |  | 1 | 11 | 10 | 8 |
| 10 | 20 | D | 0.2 |  | 1 | 12 | 9 | 8− |
| 10 | 20 | F | 0.2 |  | 1 | 10 | 8 | 8+ |

Table II shows the results of screening a series of polymers for use as flocculating and settling aids in Monongahela River water. In each case, 20 p.p.m. of an inorganic coagulant was also used.

TABLE II

| Polymer | P.p.m. | Forming Speed | Floc Size | Floc Settling | Clarity |
|---|---|---|---|---|---|
| A | 0.25 | 1 | 7 | 10 | 8 |
| B | 0.25 | 1 | 8 | 9 | 8 |
| F | 0.25 | 1 | 9+ | 10 | 9 |
| F (hyd. 5%) | 0.25 | 1 | 9 | 10 | 9 |
| F (hyd. 10%) | 0.25 | 1 | 10 | 10 | 9 |

A series of similar tests were run on Mississippi River water and on Wisconsin River water, including a polymer made, in proportions by weight, of 70% acrylamide, 20% diacetone acrylamide, and 10% dimethyl diallyl ammonium chloride. The results with this polymer were satisfactory.

Some of the following tests were measured against a standard used by American Cyanamid Company in which an unhydrolyzed or very slightly hydrolyzed, high molecular weight homopolymer of acrylamide known as "Superfloc 16" is used for a control. 150 grams of a silica gel to be used as the test medium is placed in a graduated cylinder and distilled water is added to the level of 800 ml. 10 ml. of 0.1 N H₂SO₄ is then added to assure that the silica gel is hydrolyzed, which reduces the pH to about 3.5. The suspension is throughfihly mixed. A separate solution of polymer is then prepared by adding 1 ml. of a 1 g./l. solution of the polymer (thus a concentration of 1 p.p.m.) to 300 ml. of water. This 300 ml. quantity is then poured into the graduate and the suspended solids immediately begin to settle. The period of time is measured for the lower boundry of clear water to pass from the 1000 ml. level to the 600 ml. level. A typical result for "Superfloc 16" is 164 seconds. Hence a simple formula has been proposed as a "settling index" in which the settling index of a given polymer is equal to 164 times the ratio of the time for the control sample of "Superfloc 16" over the time for the polymer in question.

$$\text{Settling index} = 164 \times \frac{T \text{ (Superfloc)}}{T \text{ (new polymer)}}$$

obviously, the higher the settling index is, the better the results. Settling indices for a polymer having a 90/10 ratio of acrylamide and diacetone acrylamide were, respectively, 266, 278, and 290. Copolymers of 75/25 and 50/50 acrylamide-diacetone acrylamide performed satisfactorily on Florida cane juice.

Table III shows the results of flocculation and settling "jar tests," comparing acrylamide/diacetone acrylamide, copolymers (75/25 and 50/50, by weight) with other polymers used on a green liquor sample from a paper company.

TABLE III

| Polymer | P.p.m. | Settling | Clarity |
|---|---|---|---|
| C | 2 | (1) Best | Good. |
| A | 2 | (3) Poor | Fair. |
| F | 2 | (1) Fair | Fair. |
| Polyacrylamide (15% hydrolyzed) | 2 | (4) Poor | Fair. |
| Purifloc A-21 Polyacrylamide | 2 | (3) Poor | Fair. |
| Na₂CO₃ | 20 | (2) Poor | Fair. |
| Dextran | 2 | | |
| Na₂CO₃ | 20 | (2) Poor | Fair. |
| A | 2 | | |
| Na₂CO₃ | 20 | (1) Best | Good. |
| C | 2 | | |

In Table IV, green liquor samples were treated in standard jar tests with the polymers (flocculants) listed. The terms "PAM" and "DAA" mean polymers of, respectively, acrylamide and diacetone acrylamide. The ratios are stated in weight percents. The number 1 indicates the best result.

TABLE IV.—JAR TESTS
Green Liquor Sample #1
[500 ml.—185° F.]

| Flocculants | P.p.m. | Settling | Clarity |
|---|---|---|---|
| A. PAM & DAA: | | | |
| 60%:40% | 2.0 | 3 | 4 |
| 70%:30% | 2.0 | 2 | 2 |
| 80%:20% | 2.0 | 1 | 1 |
| 90%:10% | 2.0 | 3 | 3 |
| B. PAM & DAA: | | | |
| 80%:20% | 2.0 | 1 | 1 |
| 75%:25% (4% Hyd.) | 2.0 | 2 | 2 |
| 50%:50% | 2.0 | 3 | 3 |

Green Liquor Sample #2

| | | | |
|---|---|---|---|
| Control | None | | |
| B | 1.0 | 2 | 2 |
| F | 1.0 | 1 | 1 |

Green Liquor Sample #3

| | P.p.m. | Settling | Clarity |
|---|---|---|---|
| A. B | 2.0 | 3 | 3 |
| C | 2.0 | 2 | 2 |
| 70% PAM:30% DAA | 2.0 | 4 | 4 |
| 70% PAM:20% DAA:10% DMDAA* | 2.0 | 1 | 1 |
| B. F | 2.0 | 3 | 3 |
| 70% PAM:20% DAA:10% DMDAA (Liq.) | 2.0 | 1 | 1 |
| C | 2.0 | 2 | 2 |

Green Liquor Sample #4

| | | | |
|---|---|---|---|
| Control | 0 | 4 | 4 |
| B | 1 | 2 | 2 |
| F | 1 | 1 | 1 |

[500 ml.—120° F.]

| | | | |
|---|---|---|---|
| Control | | 4 | 4 |
| B | 2 | 2 | 2 |
| F | 2 | 1 | 1 |

Green Liquor Sample #5
[500 ml.—185° F.]

| | | | |
|---|---|---|---|
| B | 2 | 3 | 3 |
| C | 2 | 2 | 2 |
| 70% PAM:30% DAA | 2 | 4 | 4 |
| 70% PAM:20% DAA (DD):10% (DMDAA) | 2 | 1 | 1 |

*DMDAA: dimethyl diallyl ammonium chloride.

Table V shows the use of various terpolymers of dimethyl diallyl ammonium chloride, polyacrylamide, and diacetone acrylamide for green liquor clarification.

TABLE V.—JAR TESTS
Green Liquor Clarification—Sample A
[500 ml.—185° F.]

| Flocculants | P.p.m. | Settling | Clarity |
|---|---|---|---|
| DMDAAC:PAM:DAA: | | | |
| 50%:30%:20% | 2.0 | 1 | 1 |
| 50%:30%:20% (10% Hyd.) | 2.0 | 2 | 2 |
| 50%:40%:10% | 2.0 | 3 | 3 |
| 50%:40%:10% (10% Hyd.) | 2.0 | 4 | 4 |
| 30%:50%:20% | 2.0 | 4 | 4 |
| 10%:70%:20% | 2.0 | 2 | 2 |
| 0%:75%:25% | 2.0 | 3 | 3 |

Green Liquor Clarification—Sample B

| Flocculants | P.p.m. | Settling | Clarity |
|---|---|---|---|
| DMDAAC:PAM:DAA: | | | |
| 50%:30%:20% | 2.0 | 4 | 4 |
| 20%:60%:20% | 2.0 | 3 | 3 |
| 10%:70%:20% | 2.0 | 1 | 1 |
| 0%:75%:25% | 2.0 | 2 | 2 |

Since polymers having greater than 65% by weight diacetone acrylamide, regardless of the comonomers, tend to be water-insoluble, we prefer to use polymers having between 2.5% and 65% by weight diacetone acrylamide. The balance of the polymer may be made with any copolymerizable monomers which in combination will produce a water-soluble polymer. Generally speaking, monomers which include more than one polymerizable group will tend to cross-link and render the product insoluble; however, there are exceptions—notably the diallyl ammonium compounds described in Butler's U.S. Patent 3,288,770. These diallyl ammonium compounds form linear, water-soluble copolymers with diacetone acrylamide.

Of the diallyl ammonium compounds, we prefer to use the chloride forms of dimethyl, diethyl, and methyl dodecyl ammonium. Another useful cationic monomer is 2-hydroxy-3-methacrylyloxypropyl trimethyl ammonium chloride.

The most attractive comonomer for the diacetone acrylamide is unsubstituted acrylamide, homopolymers of which have been used for flocculating and as coagulant aids. See, for example, Hronas U.S. Patent 3,066,095. Preferably our polymers will have molecular weights of at least 10,000. So long as they are water-soluble, there is no known maximum molecular weight. Some of the differences in performance illustrated in Table IV, for example, may be due more to molecular weight than to the relative density of diacetone acrylamide groups.

Although we do not wish to be bound by any theories, we believe that water-soluble acrylamide polymers containing at least 2.5% by weight diacetone acrylamide are superior to homopolymers of acrylamide of comparable molecular weight in many instances because the rather bulky acetone group tends to uncoil or spread apart the acrylamide chain which otherwise would be more or less tightly knit and therefore relatively ineffective in the bridging function. See Hoover, U.S. Patent 3,332,922 for a discussion of characteristics deemed to be desirable for flocculation and coagulation.

In addition to or in place of acrylamide, we may use any comonomer which will produce, in the amount used, a water-soluble copolymer with the diacetone acrylamide. Among those which are included are acrylic esters, acrylic acid and dimethyl diallyl ammonium chloride.

Useful concentrations are those in the range of about 0.1 p.p.m. to about 2000 p.p.m., although 1–5 p.p.m. are preferred. However, even a very small amount is effective for flocculation to some degree.

We do not intend to be restricted to the above specific methods and compositions. Our invention may be otherwise practiced within the scope of the following claims.

We claim:
1. Method of flocculating finely divided solids in an aqueous medium comprising adding to said aqueous medium an amount of a water-soluble polymer of (a) about 2.5% to about 65% by weight diacetone acrylamide and (b) monomers copolymerizable therewith, sufficient to flocculate said finely divided solids.
2. Method of claim 1 in which 0.1 to 2000 p.p.m. of polymer is added to the aqueous medium.
3. Method of claim 1 in which (b) is acrylamide.
4. Method of claim 1 in which (b) is a diallyl ammonium chloride.
5. Method of claim 1 in which (b) is acrylic acid.
6. Method of claim 1 in which (b) is acrylamide, and the polymer is hydrolyzed.

7. Method of claim 1 in which (b) is 2-hydroxy-3-methacrylyloxypropyl trimethyl ammonium chloride.

8. Method of claim 1 in which (b) includes a diallyl ammonium monomer and acrylamide.

9. Method of flocculating suspended solids in water compirsing adding to said water from about 0.1 p.p.m. to about 2000 p.p.m. of a water-soluble polymer containing at least 2.5% units of diacetone acrylamide.

References Cited

UNITED STATES PATENTS 3,277,056 10/1966 Coleman _____ 260—63
3,332,922 7/1967 Hoover _____ 260—89.7

MICHAEL E. ROGERS, Primary Examiner

U.S. Cl. X.R.

260—65